(12) United States Patent  
Sidick

(10) Patent No.: US 6,834,141 B1
(45) Date of Patent: Dec. 21, 2004

(54) WIDE PASS-BAND INTERFEROMETRIC OPTICAL DEVICE UTILIZING AN OPTICAL RING-RESONATOR

(75) Inventor: Erkin Sidick, San Ramon, CA (US)

(73) Assignee: Wavesplitter Technologies, Inc., Fremont, CA (US)

( * ) Notice: Subject to any disclaimer, the term of this patent is extended or adjusted under 35 U.S.C. 154(b) by 0 days.

(21) Appl. No.: 10/277,960

(22) Filed: Oct. 22, 2002

(51) Int. Cl.$^7$ ................................................ G02B 6/26
(52) U.S. Cl. ........................................ 385/27; 385/24
(58) Field of Search ....................... 385/24, 27, 31–32, 385/39, 42, 15; 359/121, 127; 356/477, 480

(56) References Cited

U.S. PATENT DOCUMENTS 6,281,977 B1   8/2001  Paiam et al. ................ 356/480
6,580,534 B2 *  6/2003  Madsen ...................... 359/121

* cited by examiner

*Primary Examiner*—Frank G. Font
*Assistant Examiner*—Michael P. Mooney
(74) *Attorney, Agent, or Firm*—Mayer Fortkort & Williams, PC; Stuart H. Mayer, Esq.

(57) ABSTRACT

A filtering device such as an optical interleaver/deinterleaver includes first and second optical couplers each having two inputs and two outputs. The inputs of the first coupler are adapted to receive input optical signals to be filtered and the outputs of the second coupler are adapted to provide filtered output optical signals. A first optical waveguide optically couples a first output of the first coupler to a first input of the second coupler. A second optical waveguide optically couples a second output of the first coupler to a second input of the second coupler. The filtering device also includes an optical resonator and a third optical coupler optically coupling the optical resonator to the second optical waveguide.

16 Claims, 3 Drawing Sheets

Table: Results of theoretical simulations on the above two interferometric interleavers including an optical resonator. Both interleavers have FSR=100GHz.

| Parameter Name | Prior Art | Present Invention | Unit |
|---|---|---|---|
| ±10GHz Windowed Isolation | 23.9 | 27.7 | DB |
| 0.5dB Pass-band Width | 33.4 | 41.0 | GHz |
| Ripple within ±10GHz PBW | 0.017 | 0.007 | DB |
| Chromatic Dispersion within ±10GHz PBW | ±38 | ±50 | ps/nm |

WIDE PASS-BAND INTERFEROMETRIC OPTICAL DEVICE UTILIZING AN OPTICAL RING-RESONATOR

FIELD OF THE INVENTION

The present invention relates generally to WDM and DWDM communication systems, and more generally to an optical interleaver employed in such systems.

BACKGROUND OF THE INVENTION

Optical wavelength division multiplexing (WDM) and dense wavelength division multiplexing (DWDM) have gradually become the standard backbone networks for fiber optic communication systems. WDM and DWDM systems employ signals consisting of a number of different wavelength optical signals, known as carrier signals or channels, to transmit information on optical fibers. Each carrier signal is modulated by one or more information signals. As a result, a significant number of information signals may be transmitted over a single optical fiber using WDM and DWDM technology.

One approach to increasing fiber optic capacity is to use more closely spaced channels. For example, at one point in time, 200 GHz spacing was common for optical channels. At that time optical components were designed to operate on 200 GHz spaced channels. As the state of the art improved, 100 GHz spacing was used for optical channels. Optical components were then designed to operate on 100 GHz spaced channels and devices designed to operate on 200 GHz spaced channels had to be replaced or modified to operate on the 100 GHz spaced channels. This upgrade requirement can be very expensive for parties with an extensive amount of fiber optic equipment that is already deployed.

An optical device that can be used for interfacing between different channel spacing schemes is known as an interleaver/deinterleaver, which is essentially an optical router that allows systems designed for operation at a wide channel spacing to be extended to systems designed for narrow channel spacings. In its simplest form, an interleaver combines two sets of channels into one densely packed set with half the channel spacing. Interleavers/deinterleavers are also used for other purposes, such as to add/drop channels at a node in such a way that one interleaver output adds/drops local channels while the other interleaver output forwards express channels to another node.

One example of an optical interleaver/deinterleaver is an interferometric interleaver/deinterleaver such as those shown in U.S. Pat. No. 6,281,977, one of which is reproduced in FIG. 1. The interleaver/deinterleaver 100 includes a ring resonator 110 and three directional couplers 112, 114, and 116. As shown in FIG. 2, ring resonator 110 and directional couplers 112 and 114 taken by themselves define a three port device with one input port and two output ports. The three port device has a transfer function that is equivalent to a Fabry-Perot resonator. The signals $a_r$ and $a_t$ at the output ports of the device are equivalent to the reflected and transmitted signals of a Fabry-Perot resonator. The coupling coefficients of the directional couplers control the finesse of the cavity. The periodic spectral response of the three port device is determined by the total length of the ring through the following equation:

$$FSR = c/\Delta L$$

where c is the speed of light and $\Delta L$ is the optical length through the ring.

Returning to the optical interleaver/deinterleaver of FIG. 1, the two outputs of the three port device that include ring resonator 110 are routed to coupler 116 to obtain two interleaved signals, $a_{out1}$ and $a_{out2}$. An interleaving function can be realized if the optical path length AC is equal to the optical path length BC, wherein the optical length is the product of the physical length and the refractive index.

While the performance characteristics of the aforementioned interleaver/deinterleaver, which include its isolation, transmission peak ripple, and effective pass-band width, are satisfactory for certain applications, it would nevertheless be desirable to provide an interferometric interleaver/deinterleaver that has improved performance characteristics.

SUMMARY OF THE INVENTION

In accordance with the present invention, a filtering device is provided that includes first and second optical couplers each having two inputs and two outputs. The inputs of the first coupler are adapted to receive input optical signals to be filtered and the outputs of the second coupler are adapted to provide filtered output optical signals. A first optical waveguide optically couples a first output of the first coupler to a first input of the second coupler. A second optical waveguide optically couples a second output of the first coupler to a second input of the second coupler. The filtering device also includes an optical resonator and a third optical coupler optically coupling the optical resonator to the second optical waveguide.

In accordance with one aspect of the invention, the optical resonator is a ring resonator.

In accordance with another aspect of the invention, the ring resonator has a circumferential optical path length greater than twice a difference in optical path length between the second optical waveguide and the first optical waveguide.

In accordance with yet another aspect of the invention, the ring resonator has a circumferential optical path length substantially equal to a difference in optical path length between the second optical waveguide and the first optical waveguide plus one half a center wavelength of a waveband in which the filtering device operates.

In accordance with another aspect of the invention, the first and second optical couplers are substantially 50:50 couplers.

In accordance with another aspect of the invention, the third optical coupler has a bar coupling ratio of about 0.18.

In accordance with another aspect of the invention, the first and second optical couplers are directional couplers.

DETAILED DESCRIPTION

The present invention provides an optical device for multiplexing and demultiplexing a wavelength-division multiplexed (WDM) optical signal that comprises a series of closely spaced channels. Operating the device in a first direction, a multiplexing function is performed on the series channels launched into one end of the device so that the device serves as an interleaver. Operating the device in the opposite direction, a demultiplexing function is performed on a WDM optical signal launched into the opposite end of the device so that it serves as a de-interleaver. However, for simplicity the term interleaver shall be used hereafter to denote this interleaver/de-interleaver device.

Figure 1:
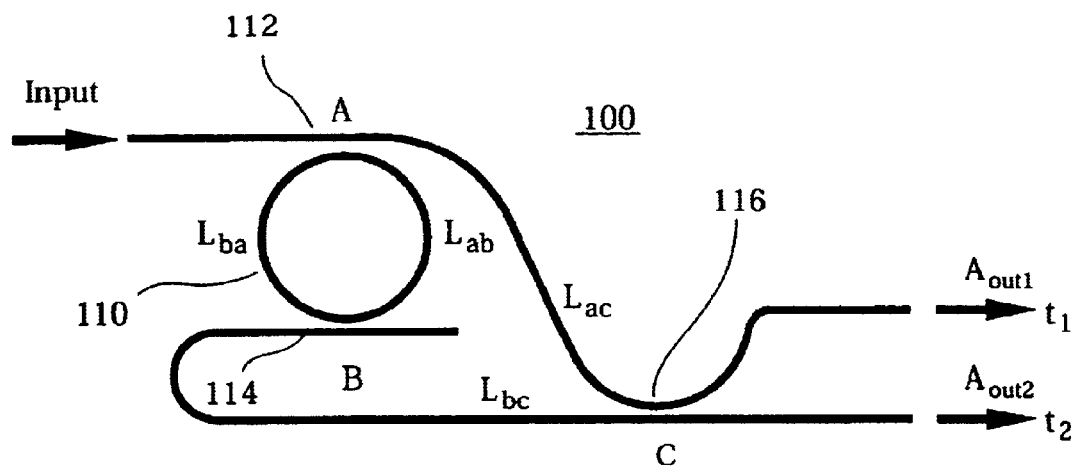
FIG. 1 shows a conventional interferometric interleaver/deinterleaver.
Figure 2:
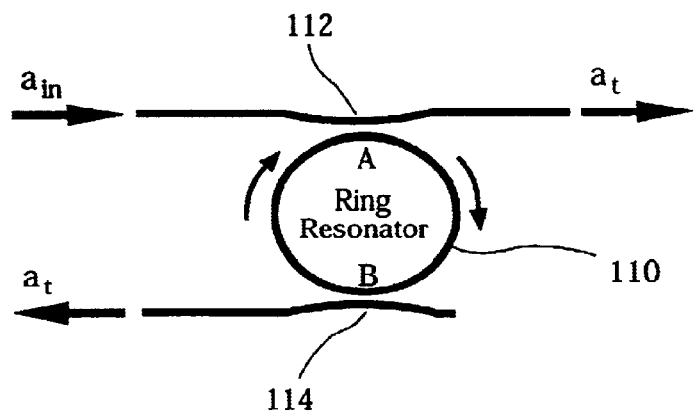
FIG. 2 shows a three port subassembly that is incorporated into the interleaver/deinterleaver depicted in FIG. 1, which includes the ring resonator and two directional couplers.

For the purposes of facilitating a better understanding of the present invention, an analysis of the interleaver depicted in FIG. 1 will first be presented before discussing the interleaver of the present invention.

The device shown in FIG. 1 provides the output response of an interleaver when appropriate coupling ratios are chosen for the couplers and when the optical path lengths of the various segments satisfy the following relationships:

$$L_{ab} + L_{bc} - L_{ac} = \frac{L_r}{2} \quad (1)$$

$$L_r = L_{ab} + L_{ba} = \frac{2c}{FSR}$$

$$c = \text{free-space light speed}$$

c=free-space light speed
where $L_{ab}$ is the optical path length of ring 110 along the path between couplers 112 and 114, $L_{ba}$ is the optical path length of ring 100 along the path between couplers 114 and 112, $L_{bc}$, is the optical length of the path between couplers 114 and 116, $L_{ac}$ is the optical path length of the path between couplers 112 and 116, $L_r$ is the optical path length of the circumference of ring resonator 110, and the FSR denotes the Free-Spectral Range of the device. The intensity bar-coupling ratio of each coupler i will be denoted $\kappa_i$. The optical performance of this device is determined by the coupling ratios of the three couplers as well as the various optical path lengths. The electric field transmission coefficients at the two outputs of the device can be derived as $$t_1 = \frac{\cos\phi_c(\cos\phi_a - \cos\phi_b e^{-j\theta}) + j\sin\phi_c(\sin\phi_a \sin\phi_b e^{-j\theta/2})}{1 - \cos\phi_a \cos\phi_b e^{-j\theta}} \quad (2)$$

$$t_2 = -\frac{j\sin\phi_c(\cos\phi_a - \cos\phi_b e^{-j\theta}) + \cos\phi_c(\sin\phi_a \sin\phi_b e^{-j\theta/2})}{1 - \cos\phi_a \cos\phi_b e^{-j\theta}}$$

$$\theta = \frac{\omega}{c} L_r$$

where ω is the angular frequency of the input optical signal. When all the directional couplers are Jossless, their electric field bar-coupling ratio cosφ, and the cross-coupling ratio sinφ, are related to $\kappa_i$ by $$\cos\phi_i = \sqrt{\kappa_1} \quad (3)$$

$$\sin\phi_i = \sqrt{1-\kappa_1}$$

In this derivation, the following coupler's coupling matrix $S_c$ and a waveguide segment's propagation matrix $S_p$ were used:

$$S_c = \begin{bmatrix} \cos\phi & -j\sin\phi \\ -j\sin\phi & \cos\phi \end{bmatrix}, S_p = \begin{bmatrix} e^{-j\theta} & 0 \\ 0 & e^{j\theta} \end{bmatrix}$$

Figure 3:
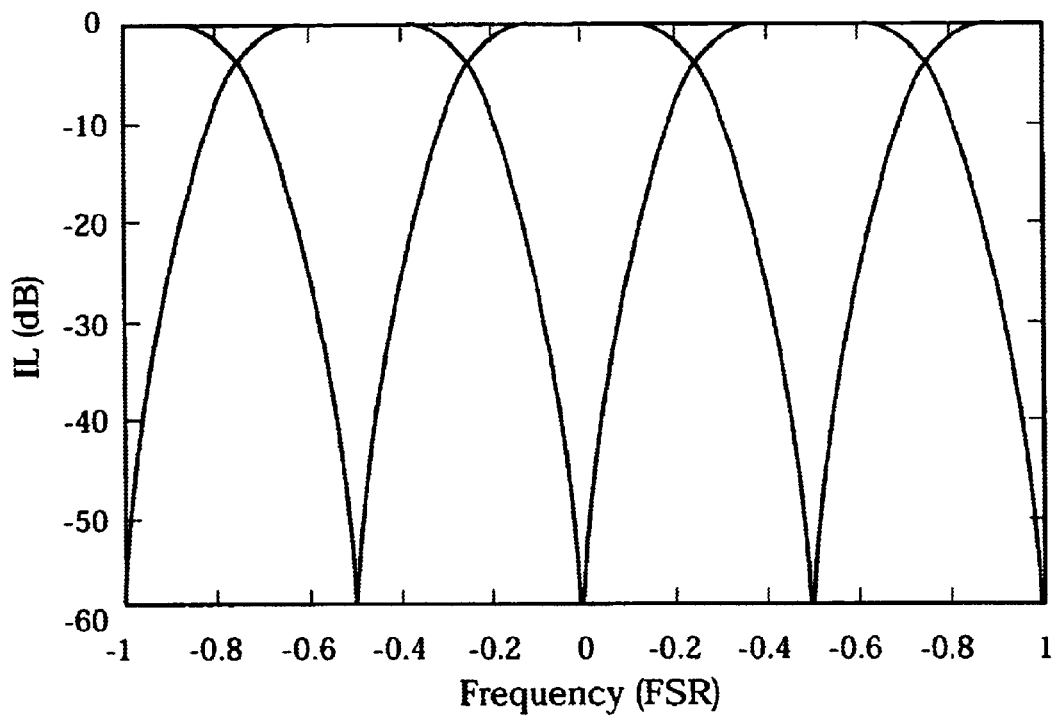
FIG. 3 shows an exemplary optical spectral response provided by the device depicted in FIG. 1.

If the bar coupling ratios are selected to be $\kappa_{112}=\kappa_{114}=0.171$ and $\kappa_{116}=0.05$ and ideal optical path length values are used, the resulting optical spectral response is shown in FIG. 3. This spectral response will be compared below to the spectral response of the interleaver constructed in accordance with the present invention.

Figure 4:
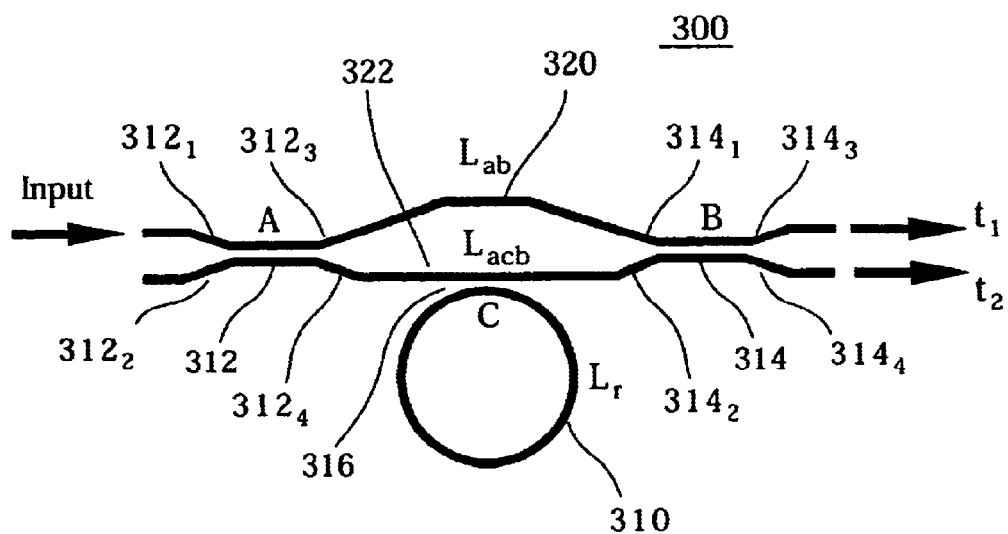
FIG. 4 shows one embodiment of an optical filter constructed in accordance with the present invention.

FIG. 4 shows one embodiment of the inventive optical filter 300. The optical filter 300 includes a ring resonator 310 and three directional couplers 312, 314, and 316. The coupler 312 has two inputs $312_1$ and $312_2$ for receiving the optical signals to be interleaved. The coupler 312 also includes two outputs $312_3$ and $312_4$ that are respectively coupled to the inputs $314_1$ and $314_2$ of coupler 314 via respective optical paths 320 and 322. Directional coupler 316 couples ring resonator 310 to one of the optical paths interconnecting coupler 312 to 314. In particular, directional coupler 316 couples ring resonator to optical path 322 interconnecting output $312_4$ to input $314_2$.

The optical filter 300 shown in FIG. 4 provides the output response of an interleaver when appropriate coupling ratios are chosen for the couplers and when the optical path lengths of the various segments satisfy the following relationships:

$$\Delta L = L_{ab} - L_{acb} \quad (4)$$

$$L_r = 2\Delta L + \frac{\lambda_0}{2}$$

$$FSR = \frac{c}{\Delta L}$$

where $L_{ab}$ is the length of the optical path 320 between the output $312_3$ of coupler 312 and the input $314_1$ of coupler 314, $L_{acb}$ is the length of the optical path 322 between the output $312_4$ of coupler 312 and the input $314_2$ of coupler 314, $L_r$ is the circumferencial optical path length of ring resonator 310, FSR denotes the Free-Spectral Range of the device, and $\lambda_0$ denotes the center wavelength at which the device is to be operated, which is typically the center wavelength of the C- or L-band.

The optical performance of the optical filter 300 is determined by the coupling ratios of the three couplers as well as the various optical path lengths. The electric field transmission coefficients at the two outputs of the device can be derived as $$t_1 = \cos\phi_a \cos\phi_b H_r - \sin\phi_a \sin\phi_b e^{-j\theta}$$

$$t_2 = -j(\sin\phi_a \cos\phi_b H_r + \cos\phi_a \sin\phi_b e^{-j\theta})$$

$$t_1 = \cos\phi_a \cos\phi_b H_r - \sin\phi_a \sin\phi_b e^{-j\theta} \quad (5)$$

$$t_2 = -j(\sin\phi_a \cos\phi_b H_r + \cos\phi_a \sin\phi_b e^{-j\theta})$$

$$H_r = \frac{\cos\phi_c - e^{-j\frac{\omega}{c}L_r}}{1 - \cos\phi_c e^{-j\frac{\omega}{c}L_r}}$$

$$\theta = \frac{\omega}{c}\Delta L$$

Figures 5, 6:
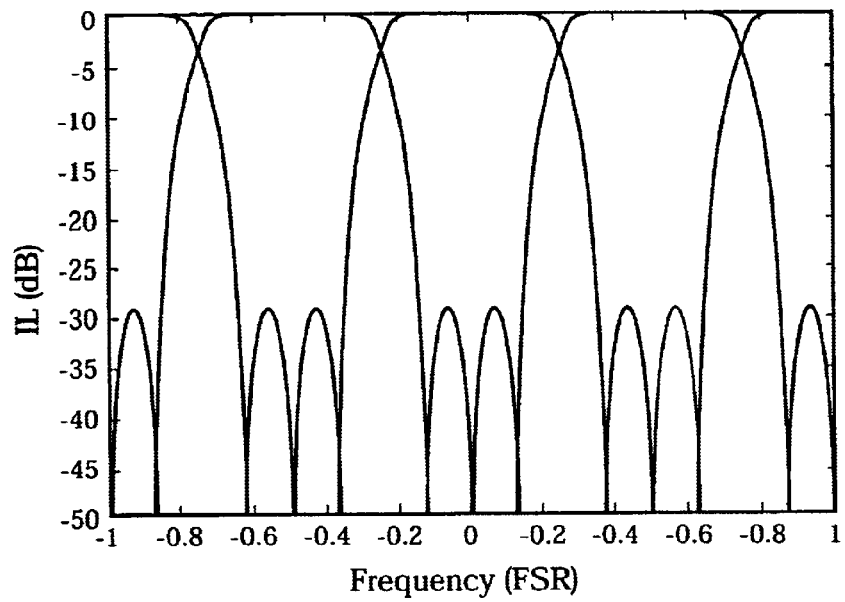
FIG. 5 shows the optical spectral response for the optical filter shown in FIG. 4.
FIG. 6 is a table summarizing the results of a theoretical simulation comparing the inventive optical device of FIG. 4 with the prior art optical device depicted in FIG. 1 when the FSR for both devices is 100 GHz.

The inventor has determined that in one particularly advantageous embodiment of the invention a desired optical spectral response can be achieved if $\kappa_{312}=\kappa_{314}=0.50$ and $\kappa_{316}=0.18$. This spectral response is depicted in FIG. 5. FIG.

6 is a table summarizing the results of a theoretical simulation comparing the inventive optical device of FIG. 4 with the prior art optical device depicted in FIG. 1 when the FSR for both devices is 100 GHz. As the table indicates, the present invention provides larger isolation, wider pass-band width (PBW>80% of the channel spacing) and a smaller ripple as compared to the prior art device.

The interleaver of the present invention may be fabricated on a Planar Light-Guide Circuit (PLC). A planar lightwave circuit, also known as an optical integrated circuit, can be readily mass produced because the processing steps are compatible with those used in silicon integrated circuit (IC) technology, which are well known and geared for mass production. One common type of planar lightwave circuit employs doped-silica waveguides fabricated with silicon optical bench technology. Doped-silica waveguides are usually preferred because they have a number of attractive properties including low cost, low loss, low birefringence, stability, and compatibility for coupling to fiber. Such a planar lightwave circuit is fabricated on a carrier substrate, which typically comprises silicon. The substrate serves as a mechanical support for the otherwise fragile lightwave circuit and it can, under certain circumstances (i.e., high transparency and low index of refraction), also play the role of the bottom portion of the cladding. In addition, it can serve as a fixture to which input and output fibers are attached so as to optically couple cores of an input/output fiber to the cores of the planar lightwave circuit. The fabrication process begins by depositing a base or lower cladding layer of low index silica on the carrier substrate (assuming the substrate itself is not used as the cladding layer). A layer of doped glass with a higher refractive index, i.e., the core layer, is then deposited on top of the lower cladding layer. The core layer is subsequently patterned or sculpted into structures required by the optical circuits using photo-lithographic techniques similar to those used in integrated circuit fabrication. Lastly, a top cladding layer is deposited to cover the patterned waveguide core. It should be noted that while the interleaver of the present invention may employ doped-silica waveguides, those of ordinary skill in the art will recognize that the present invention is not limited to silica waveguides but more generally, may encompass waveguides based on other glass compositions such as oxides of germanium, phosphorus, and boron as well as combinations thereof.

What is claimed is:

1. A filtering device comprising:
   first and second optical couplers each having two inputs and two outputs, the inputs of the first coupler being adapted to receive input optical signals to be filtered and the outputs of the second coupler being adapted to provide filtered output optical signals;
   a first optical waveguide optically coupling a first output of the first coupler to a first input of the second coupler;
   a second optical waveguide optically coupling a second output of the first coupler to a second input of the second coupler;
   an optical ring resonator, wherein the ring resonator has a circumferential optical path length greater than twice a difference in optical path length between the second optical waveguide and the first optical waveguide; and
   a third optical coupler optically coupling the optical resonator to the second optical waveguide.

2. A filtering device as defined in claim 1, wherein the first and second optical couplers are substantially 50:50 couplers.

3. A filtering device as defined in claim 1, wherein the third optical coupler has a bar coupling ratio of about 0.18.

4. A filtering device as defined in claim 2, wherein the third optical coupler has a bar coupling ratio of about 0.18.

5. A filtering device as defined in claim 1, wherein the first and second optical couplers are directional couplers.

6. A filtering device as defined in claim 1, wherein the first and second optical couplers are directional couplers.

7. A filtering device as defined in claim 1, wherein the output optical signals at the outputs of the second optical coupler are de-interleaved.

8. A filtering device as defined in claim 1 wherein the first, second and third optical couplers, the first and second optical waveguides, and the third optical coupler are formed in a planar lightguide circuit.

9. A filtering device comprising:
   first and second optical couplers each having two inputs and two outputs, the inputs of the first coupler being adapted to receive input optical signals to be filtered and the outputs of the second coupler being adapted to provide filtered output optical signals;
   a first optical waveguide optically coupling a first output of the first coupler to a first input of the second coupler;
   a second optical waveguide optically coupling a second output of the first coupler to a second input of the second coupler;
   an optical ring resonator, wherein the ring resonator has a circumferential optical path length substantially equal to a difference in optical path length between the second optical waveguide and the first optical waveguide plus one half a center wavelength of a waveband in which the filtering device operates; and
   a third optical coupler optically coupling the optical resonator to the second optical waveguide.

10. A filtering device as defined in claim 9, wherein the first and second optical couplers are substantially 50:50 couplers.

11. A filtering device as defined in claim 9, wherein the third optical coupler has a bar coupling ratio of about 0.18.

12. A filtering device as defined in claim 10, wherein the third optical coupler has a bar coupling ratio of about 0.18.

13. A filtering device as defined in claim 9, wherein the first and second optical couplers are directional couplers.

14. A filtering device as defined in claim 10, wherein the first and second optical couplers are directional couplers.

15. A filtering device as defined in claim 9, wherein the output optical signals at the outputs of the second optical coupler are de-interleaved.

16. A filtering device as defined in claim 9, wherein the first, second and third optical couplers, the first and second optical waveguides, and the third optical coupler are formed in a planar lightguide circuit.

* * * * *

UNITED STATES PATENT AND TRADEMARK OFFICE
CERTIFICATE OF CORRECTION

PATENT NO. : 6,834,141 B1
DATED : December 21, 2004
INVENTOR(S) : Erkin Sidick

It is certified that error appears in the above-identified patent and that said Letters Patent is hereby corrected as shown below:

Column 3,
Line 32, delete entire line, i.e., delete "c = free-space light speed"
Line 57, change "Jossless" to -- lossless --.
Line 58, after "ratio", change "cosø," to -- $\cos\varnothing_i$ --.
Line 59, change "sinø," to -- $\sin\varnothing_i$ --.
Line 60, change formula 3 from " $$\cos\phi_i = \sqrt{\kappa_1}$$
$$\sin\phi_i = \sqrt{1-\kappa_1}$$ "

to -- $$\cos\phi_i = \sqrt{\kappa_i}$$
$$\sin\phi_i = \sqrt{1-\kappa_i}$$ --

Column 4,
Line 7, after "$k_{116}=$", change "0.05" to -- 0.50 --.
Line 50, change equation 5 from:

" $$t_1 = \cos\phi_a \cos\phi_b H_r - \sin\phi_a \sin\phi_b e^{-j\theta}$$
$$t_2 = -j(\sin\phi_a \cos\phi_b H_r + \cos\phi_a \sin\phi_b e^{-j\theta})$$
$$t_1 = \cos\phi_a \cos\phi_b H_r - \sin\phi_a \sin\phi_b e^{-j\theta}$$
$$t_2 = -j(\sin\phi_a \cos\phi_b H_r + \cos\phi_a \sin\phi_b e^{-j\theta})$$
$$H_r = \frac{\cos\phi_c - e^{-j\frac{\omega}{c}L_r}}{1-\cos\phi_c e^{-j\frac{\omega}{c}L_r}}$$
$$\theta = \frac{\omega}{c}\Delta L$$ "

to -- $$t_1 = \cos\phi_a \cos\phi_b H_r - \sin\phi_a \sin\phi_b e^{-j\theta}$$
$$t_2 = -j(\sin\phi_a \cos\phi_b H_r + \cos\phi_a \sin\phi_b e^{-j\theta})$$
$$H_r = \frac{\cos\phi_c - e^{-j\frac{\omega}{c}L_r}}{1-\cos\phi_c e^{-j\frac{\omega}{c}L_r}}$$
$$\theta = \frac{\omega}{c}\Delta L$$ --

Signed and Sealed this

Seventeenth Day of May, 2005

JON W. DUDAS
*Director of the United States Patent and Trademark Office*